United States Patent
Wu

(10) Patent No.: US 7,149,692 B1
(45) Date of Patent: Dec. 12, 2006

(54) METHOD, APPARATUS AND SYSTEM FOR A SINGLE CHIP AUDIO SOLUTION CONTROLLER AND DSP

(75) Inventor: Mark Wu, Foster City, CA (US)

(73) Assignee: Silicon Motion, Inc., San Jose, CA (US)

( * ) Notice: Subject to any disclaimer, the term of this patent is extended or adjusted under 35 U.S.C. 154(b) by 520 days.

(21) Appl. No.: 10/007,145

(22) Filed: Nov. 30, 2001

(51) Int. Cl.
*G10L 11/00* (2006.01)
*G06F 1/26* (2006.01)

(52) U.S. Cl. .................. 704/270; 713/300; 704/272
(58) Field of Classification Search ........... 713/300, 713/2; 704/256, 200.1; 710/14
See application file for complete search history.

(56) References Cited

U.S. PATENT DOCUMENTS

| | | | |
|---|---|---|---|
| 5,544,356 A | | 8/1996 | Robinson et al. |
| 5,598,563 A | * | 1/1997 | Spies ............................ 713/2 |
| 6,006,285 A | * | 12/1999 | Jacobs et al. ................. 710/14 |
| 6,038,672 A | * | 3/2000 | Klein .......................... 713/322 |
| 6,260,157 B1 | * | 7/2001 | Schurecht et al. ............. 714/8 |
| 6,266,714 B1 | * | 7/2001 | Jacobs et al. ................. 710/14 |
| 6,278,048 B1 | * | 8/2001 | Lee .............................. 84/610 |
| 6,675,233 B1 | * | 1/2004 | Du et al. ...................... 710/14 |
| 6,711,631 B1 | * | 3/2004 | Chan et al. ................... 710/14 |
| 6,721,709 B1 | * | 4/2004 | Yoo et al. .................... 704/500 |
| 6,751,681 B1 | * | 6/2004 | Torii et al. ..................... 710/8 |
| 6,754,895 B1 | * | 6/2004 | Bartel et al. ................ 717/171 |
| 6,791,481 B1 | * | 9/2004 | Altare et al. .................. 341/55 |
| 6,892,297 B1 | * | 5/2005 | Aguilar et al. ................. 713/2 |

OTHER PUBLICATIONS

Brandendburg, K. "MP3 and AAC Explained", The Proceedings of the AES 17th International Conference: High-Quality Audio Coding, Florence, Italy, Sep. 2-5, 1999.*
Biscondi, "Implementing the TMS320C6201/C6701/C6211 HPI Boot Process", Texas Instruments 1999, Application Report SPRA512.*

* cited by examiner

*Primary Examiner*—David Hudspeth
*Assistant Examiner*—Brian Albertalli
(74) *Attorney, Agent, or Firm*—Blakely, Sokoloff, Taylor & Zafman LLP

(57) ABSTRACT

An audio device comprising a single chip memory controller and digital signal processor is provided for playing audio files from or recording voice to a computer or electronic device which is in a power saving state. The audio device may be internal to the computer/electronic device or it may be external and attached to the computer/electronic device. The audio device may handle multiple audio file formats and is programmable so that additional formats may be added. In one embodiment, when the computer/electronic device is placed in a power saving state, the audio device takes over the computer/electronic device's function of handling user requests to play audio files or to record audio to the computer/electronic device. In one embodiment the audio files may be played from or written to a hard-drive on the computer/electronic device. In alternate embodiments a CD-RW may be used instead of a hard drive.

50 Claims, 20 Drawing Sheets

| Audio Device pin name | Audio Device pin # | Function |
|---|---|---|
| Key0 | 64 | Back plays the previous song on the play list |
| Key1 | 65 | Skip jumps to the next song on the play list |
| Key2 | 66 | Play/Pause toggles between Play and Pause |
| Key3 | 67 | Stop/Eject/Load toggles between Stop, Eject and Load |
| Key4 | 68 | Volume Down decreases the volume |
| Key5 | 69 | Volume Up increases the volume |
| Key6 | 70 | Mute volume |
| Key7 | 71 | Lock. Once this key is pressed, all the other keys (0-6) are inactive |

METHOD, APPARATUS AND SYSTEM FOR A SINGLE CHIP AUDIO SOLUTION CONTROLLER AND DSP

FIELD OF THE INVENTION

The invention relates to computer audio technology, generally. More specifically, the invention relates to versatile power saving audio technology in computers.

BACKGROUND

While the CD-ROM device may be used to load software onto a computer (e.g. notebook) it may also be used to play music through that same computer's speaker(s). In recent years the popularity of playing audio files from a computer's CD-ROM drive has grown as the number of people with personal computers and notebook/laptop computers has increased dramatically.

However, in order to play music it may be necessary to have special software (e.g. Windows media player) installed on the computer to play audio files from a CD. This software has traditionally been accessed by the computer system's CPU. Therefore, it may be necessary for the computer to be powered on and booted up so that a traditional operating system using the computer's CPU can play an audio file from a computer's storage location (e.g. CD-RW, hard drive, SmartMedia, etc...). These requirements can waste time and power by requiring a system to be powered on, booted-up, and for the system to remain in this mode during the playing of audio files. "The wasting of power is a more pronounced problem in a laptop computer which is running on a battery. All laptops use some type of rechargeable battery (lithium, nickel-cadmium, nickel-metal hydride).

The battery life varies depending on the type of rechargeable battery (lithium batteries tend to hold their charge longer) and how you use your computer (frequent use of disk drives consumes a lot of battery power). In addition to the main battery, laptops have other batteries to run clocks and backup CMOS RAM. (How Stuff Works by Craig Freundenrich, Ph.D. http://howstuffworks.lycos.com/laptop.htm/printable)

Referring to FIG. 1, a diagram of a notebook computer system is illustrated. The notebook computer system of FIG. 1 includes a microprocessor (also referred to as a CPU) 104 that is coupled to several types of storage systems, such as, a read only memory ("ROM") 109, a random access memory ("RAM") 110, a hard drive 111 for mass storage, and a floppy disk drive 112 or drives for storage on removable magnetic floppy disks. The notebook computer system also includes a display (e.g. active matrix display) 113, manual input devices (e.g. touchpad 101, keyboard 102), and communications devices (e.g. modem) 114. To play an audio file on this notebook 100, a user would first have to make sure the notebook 100 was powered on and running. Through entries made at the touchpad 101 or keyboard 102 the user can control the playing of audio files from a CD in the notebook's disk drive 103. However, in order to accomplish this control over the CD-ROM drive 103, the user's commands must be routed through the notebook's 100 CPU 104. In order to process the command at the CPU 104, the user must have started the notebook's audio software (e.g. Windows media player). The CPU 104 using the notebook's audio software processes the user's request (e.g. play button pushed). If for example the user has pressed the play button, the following takes place. First, the CPU 104 using the notebook's audio software retrieves an audio file from the disk drive 103. Second, the CPU decompresses the file (e.g. MP3) if necessary. Next, the digital audio data is passed to the notebook's CODEC (e.g. Intel's Audio Codec '97) 105 so that the final digital data from the disk drive 103 may be converted from a digital to analog signal. After converting digital to analog, the analog signal's strength is be increased at an amplifier 106 and sent to the notebook's speaker 107 for output as music.

Referring to FIG. 2, in the prior art there is a device 201 which would allow the playing of CD audio format files from a Notebook computer's CD-ROM 202 drive while the Notebook Computer 100 is powered off or in a power saving state such as sleep or suspend mode. The prior art system 200 includes the prior art device 201, a CD-ROM Drive 202, and Equalizer 203, a Mixer 204, an AMP 205, an Audio Chip 206, and a CODEC 207. The device 201 is limited to a single format and this device 201 is not upgradeable or programmable. Such a device does not play the audio. The device 201 is limited to processing requests (e.g. from a keypad) and converting the requests to an ATAPI command. The device 201 then forwards the ATAPI command to a CD-ROM. The CD-ROM is capable of understanding ATAPI commands. The CD-ROM actually plays the song as a result of receiving the ATAPI command from the device 201. Such a device is limited to processing requests to play audio files of CD audio format while the attached computer 100 is powered off or in a power saving state (e.g. sleep/suspend). This device 201 does not have the ability to play files of MP3, WMA, or AAC files. Moreover, this device cannot be reprogrammed through a software upgrade to play files of various audio file formats (e.g. MP3, WMA, or AAC). As stated, the device 201 only processes commands and forward those commands to a CD-ROM drive.

Referring to FIG. 3, we see a diagram of the device 201 covered in FIG. 2. We are told in the prior art that the device known as an audio interface IC 300 includes a state machine 301 as contrasted with a programmable controller. The state machine 301 connects to an SMBus interface 302, to a register block 303, to an LCD control 304, and to a clock generator 305. Also, the audio interface IC 300 includes control-button logic 306 that receives electrical signals from CD-ROM control buttons. In response to such signals, the control-button logic 306 may store data into the register block 303, or it may cause a digital volume control 307 to transmit control signals to an audio output amplifier. The audio interface IC 300 also includes a Host IDE interface 308 and an IDE-signals multiplexer 309.

What is needed is a device which does not merely pass commands through to a notebook's 100 CD-ROM drive 103 instructing it to play a CD audio file of CD audio format. A device which can read files, a device which can handle multiple formats (e.g. MP3, AAC, and WMA), and a device that is upgradeable by reprogramming the device with software upgrades is needed.

Another feature which is desirable is the ability to record voice while a computer system (e.g. laptop) 100 is powered off or in a power saving state. Currently, a computer system 100 would need to be powered on and special software controlled by the CPU 104 would be needed to handle voice recording through the system's microphone. Continuing to power the entire system when the user is merely attempting to record voice through a microphone to a disc on the system's disk drive 103 wastes valuable battery 108 power. Furthermore, requiring the computer system 100 to be powered on and to bootup is time consuming.

As stated above the computer system 100 is powered by a battery 108 with a limited life. By developing a single device which allows for the playing and recording of audio files while a computer (e.g. notebook) 100 is powered off or placed in a power saving state, a significant reduction in power use may be realized. This may increase the battery life on notebook computers. In addition to battery life, time and convenience may be achieved by such a single device solution. Finally, by developing a single device which is both upgradeable and programmable, the single device will have an increased longevity and provide a greater benefit to the user than devices similar to the device in the prior art.

SUMMARY OF THE INVENTION

In one embodiment, the invention is an apparatus. The apparatus includes a micro-controller. The apparatus also includes an input device coupled to the micro-controller to receive user entries to control a primary device's audio device when the primary device is in a power saving state. The apparatus also includes an interface or a plurality of interfaces coupled to the micro-controller, the interface or interfaces to provide the micro-controller with access to a storage location or a plurality of storage locations, where the storage location or storage locations are coupled to the primary device. The apparatus also includes a gateway coupled to the micro-controller. The apparatus also includes A DSP coupled to the gateway, the DSP to read user requested files, decode user requested files, and write to user files. The apparatus also includes an output port coupled to the DSP, the output port to transmit a decoded audio stream out of the DSP and receive a digital signal into the DSP.

In an alternate embodiment, the invention is a method. The method includes recognizing that a primary device with a storage location or storage locations has been placed in a power saving mode. The method also includes switching the ability to access the storage location or storage locations from a primary device to an audio device after the primary device has been placed in a power saving mode.

In another alternate embodiment, the invention is a method. The method includes searching a storage location for a digital signal processor (DSP) boot program. The method also includes providing the DSP with a boot program. The method also includes searching for updates to the DSP or micro-controller's firmware. The method also includes providing the firmware updates to the DSP and/or micro-controller.

In an additional alternate embodiment, the invention is a method. The method includes accepting a user request at a keypad, to process an audio file located on a primary device's storage location. The method also includes converting the user request to an entry code. The method also includes transmitting the entry code to an audio device. The method further includes determining the entry code's function. The method further includes locating the audio file on the audio device's storage location. The method further includes processing the audio file.

These and other features and advantages of the present invention will be apparent from a review of the detailed description and its accompanying drawings that follow.

BRIEF DESCRIPTION OF THE DRAWINGS

The present invention is illustrated by way of example and not limitation in the figures of the accompanying drawings, in which like references indicate similar elements, and in which:

FIG. 8*b* illustrates a table of the functions associated with each keypad entry.

DETAILED DESCRIPTION

Figure 1:
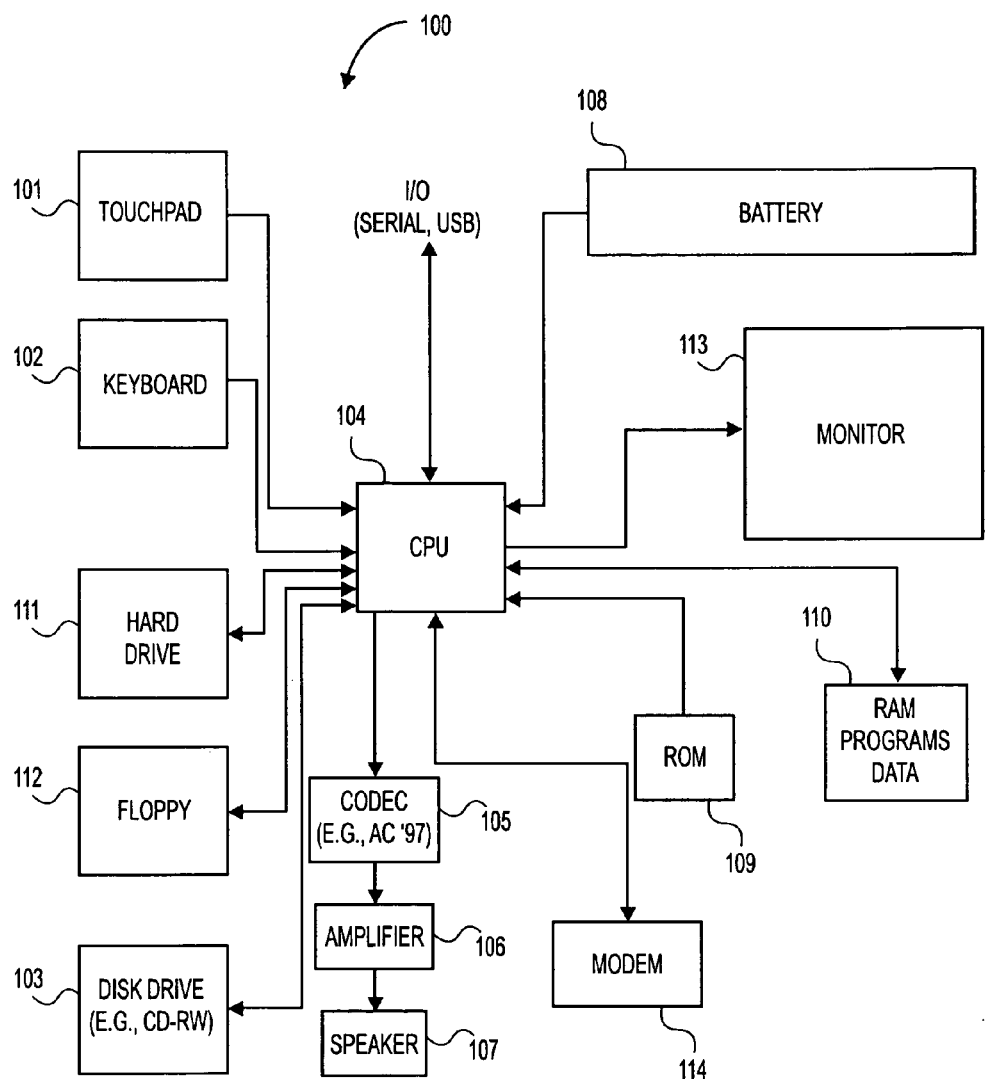
FIG. 1 illustrates an embodiment of a notebook computer.
Figure 2:
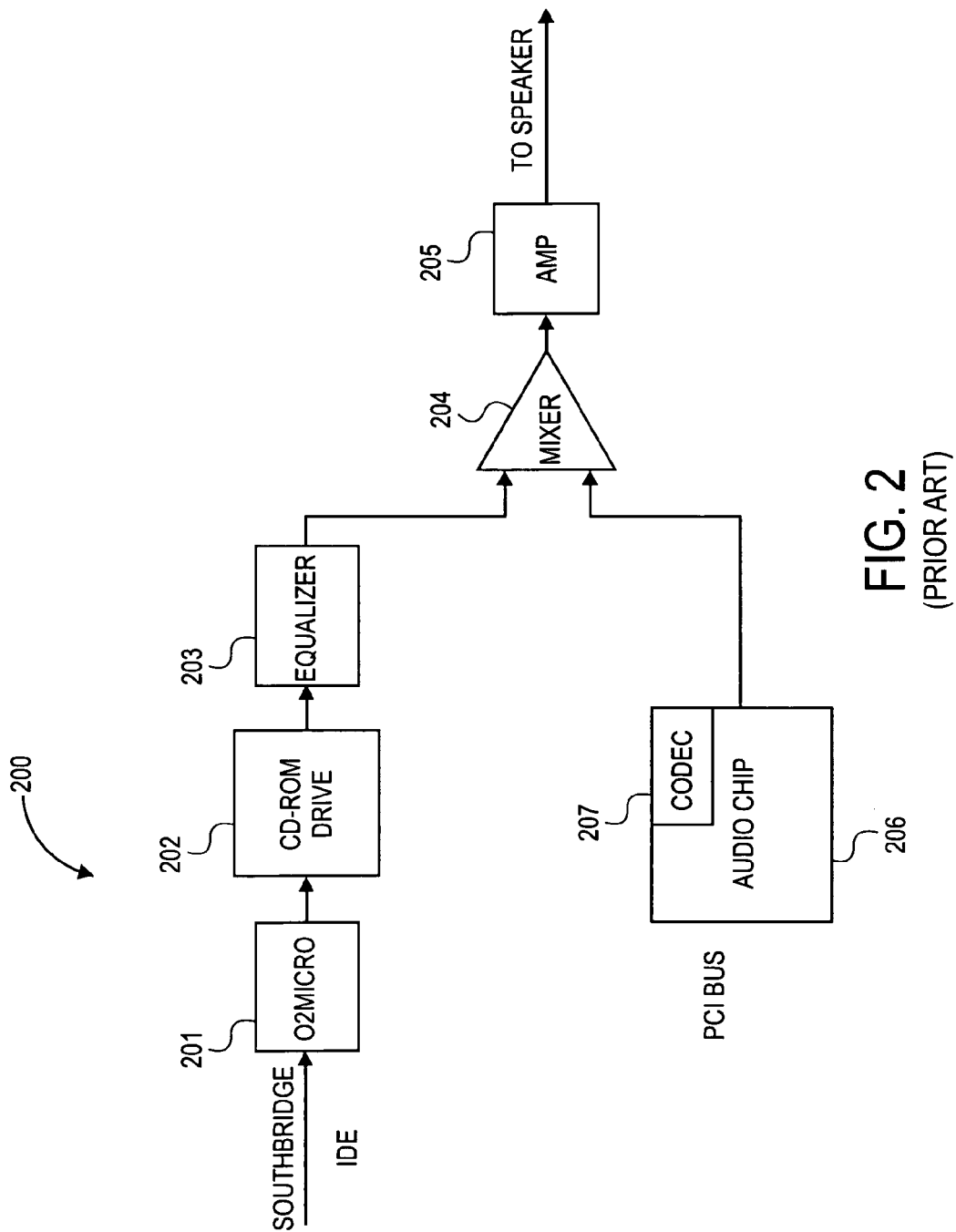
FIG. 2 illustrates an embodiment of a prior-art audio device in a notebook computer.
Figure 3:
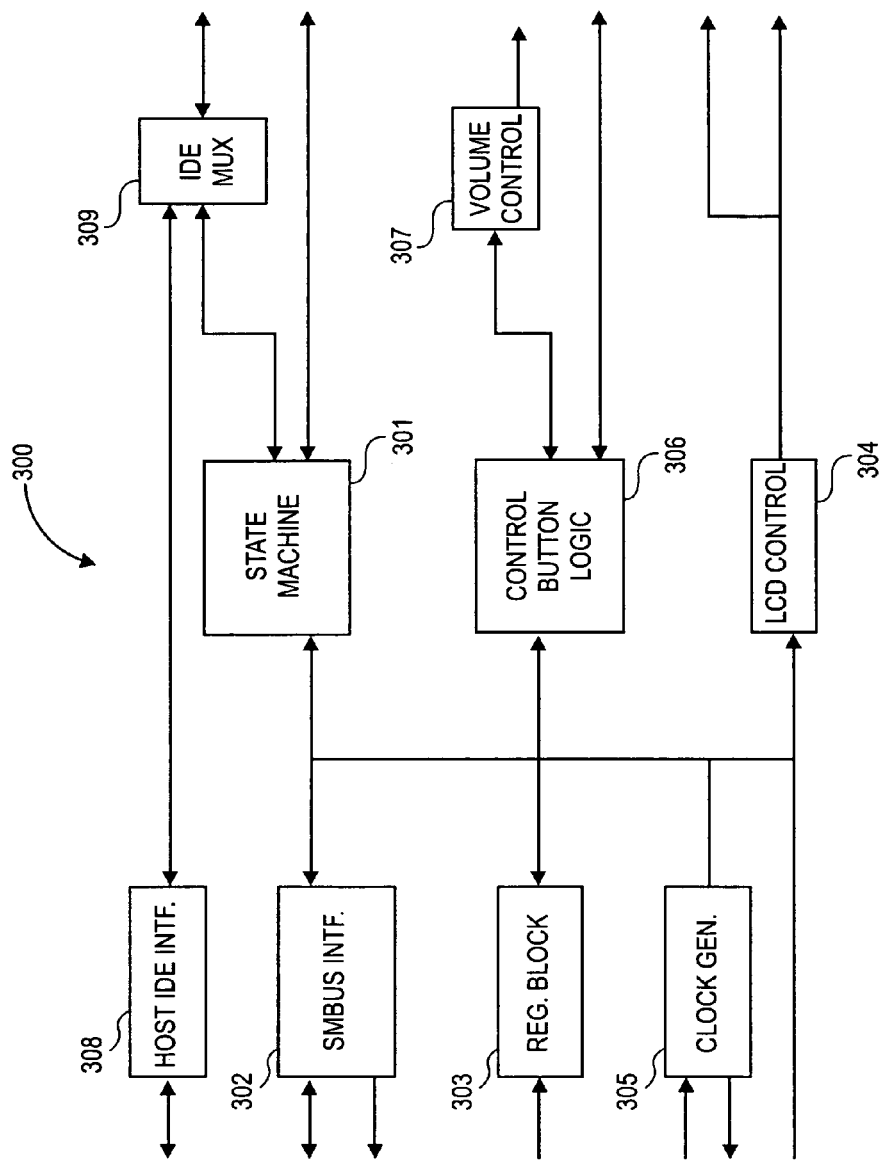
FIG. 3 illustrates an alternate embodiment of the prior-art device of FIG. 2.

Embodiments of the present invention (as described below as well as others) may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

In one embodiment, the invention is an apparatus. The apparatus includes a micro-controller. The apparatus also includes an input device coupled to the micro-controller to receive user entries to control a primary device's audio device when the primary device is in a power saving state. The apparatus also includes an interface or a plurality of interfaces coupled to the micro-controller, the interface or interfaces to provide the micro-controller with access to a storage location or a plurality of storage locations, where the storage location or storage locations are coupled to the primary device. The apparatus also includes a gateway coupled to the micro-controller. The apparatus also includes A DSP coupled to the gateway, the DSP to read user requested files, decode user requested files, and write to user files. The apparatus also includes an output port coupled to the DSP, the output port to transmit a decoded audio stream out of the DSP and receive a digital signal into the DSP.

In an alternate embodiment, the invention is a method. The method includes recognizing that a primary device with a storage location or storage locations has been placed in a power saving mode. The method also includes switching the ability to access the storage location or storage locations from a primary device to an audio device after the primary device has been placed in a power saving mode.

In another alternate embodiment, the invention is a method. The method includes searching a storage location for a digital signal processor (DSP) boot program. The method also includes providing the DSP with a boot program. The method also includes searching for updates to the DSP or micro-controller's firmware. The method also includes providing the firmware updates to the DSP and/or micro-controller.

In an additional alternate embodiment, the invention is a method. The method includes accepting a user request at a keypad, to process an audio file located on a primary device's storage location. The method also includes converting the user request to an entry code. The method also includes transmitting the entry code to an audio device. The method further includes determining the entry code's function. The method further includes locating the audio file on the audio device's storage location. The method further includes processing the audio file.

The invention provides, in various embodiments, a method and architecture which may play audio files of multiple formats (e.g. MP3, WMA, AAC) from a primary device's (e.g. notebook computer, audio jukebox, etc...) storage location (e.g. CD-RW, hard drive, SmartMedia), or record voice to a primary device's storage location while the primary device is in a power saving mode (e.g. power off mode, suspend mode, sleep mode, or a similar power saving mode).

One embodiment described is a low-power, single chip, audio file (e.g. MP3) player with a direct IDE interface to a storage location (e.g. hard drive, CD-RW, SmartMedia). In this embodiment, an MP3 decoder, 8051 micro-controller, ATAPI interface, IDE interface, keypad interface, and CODEC interface are incorporated. This embodiment may be suitable for low-power audio file (e.g. MP3) playback applications such as a laptop while in OFF mode.

Figure 4:
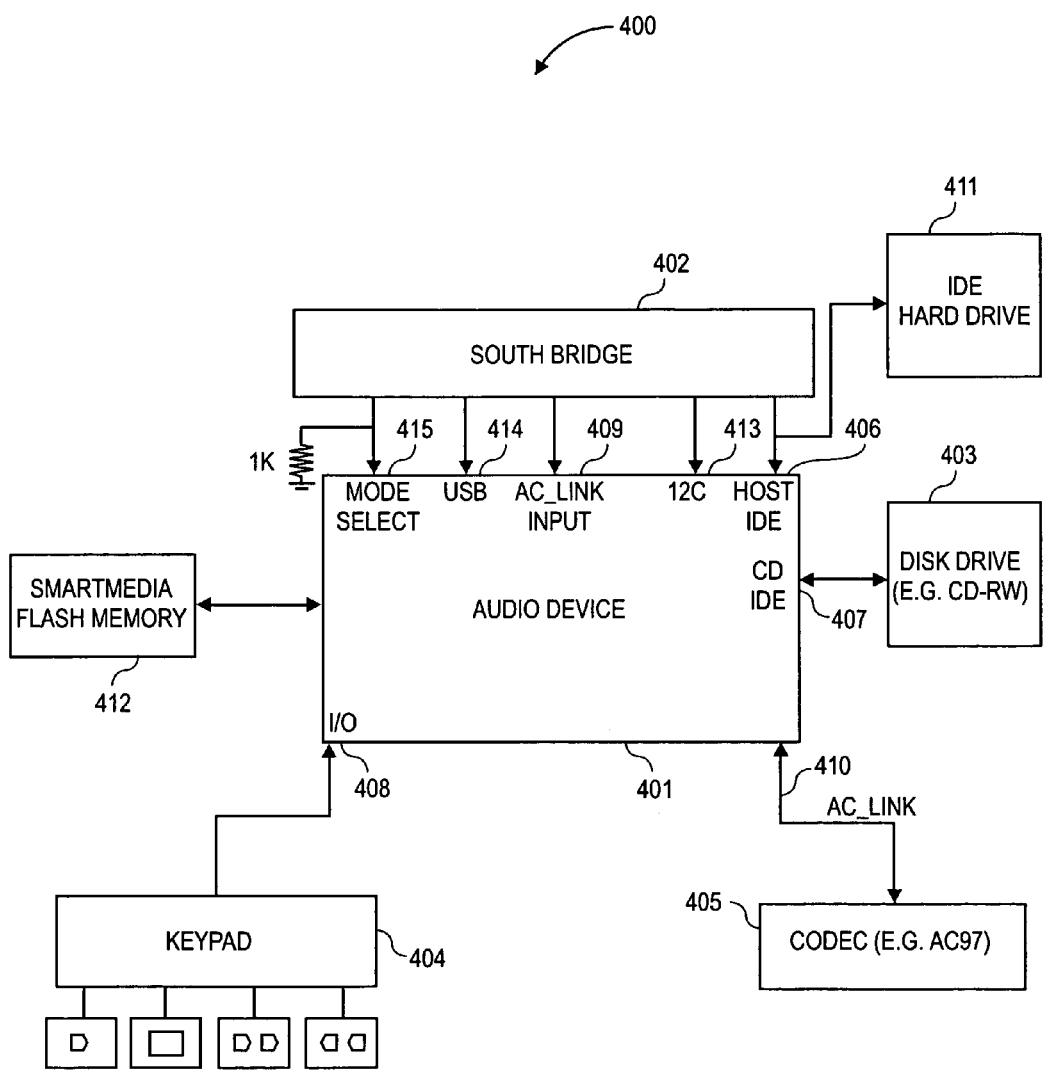
FIG. 4 illustrates an embodiment of the architecture described within a system.

FIG. 4 illustrates an embodiment of the architecture described within a system 400. The audio device 401 described may be implemented on a single integrated circuit or on multiple integrated circuits; the embodiment described is not limited to playing audio files of the CD audio format (e.g., CD_DA) from the computer's storage locations. The architecture of the embodiment described may play MP3, WMA, or the AAC formats. Furthermore, the embodiment described may be modified through software upgrades to handle additional or different audio formats. Also, the embodiment may be used to record voice to a storage location on the computer while the computer is in a power saving mode.

Figure 5A:
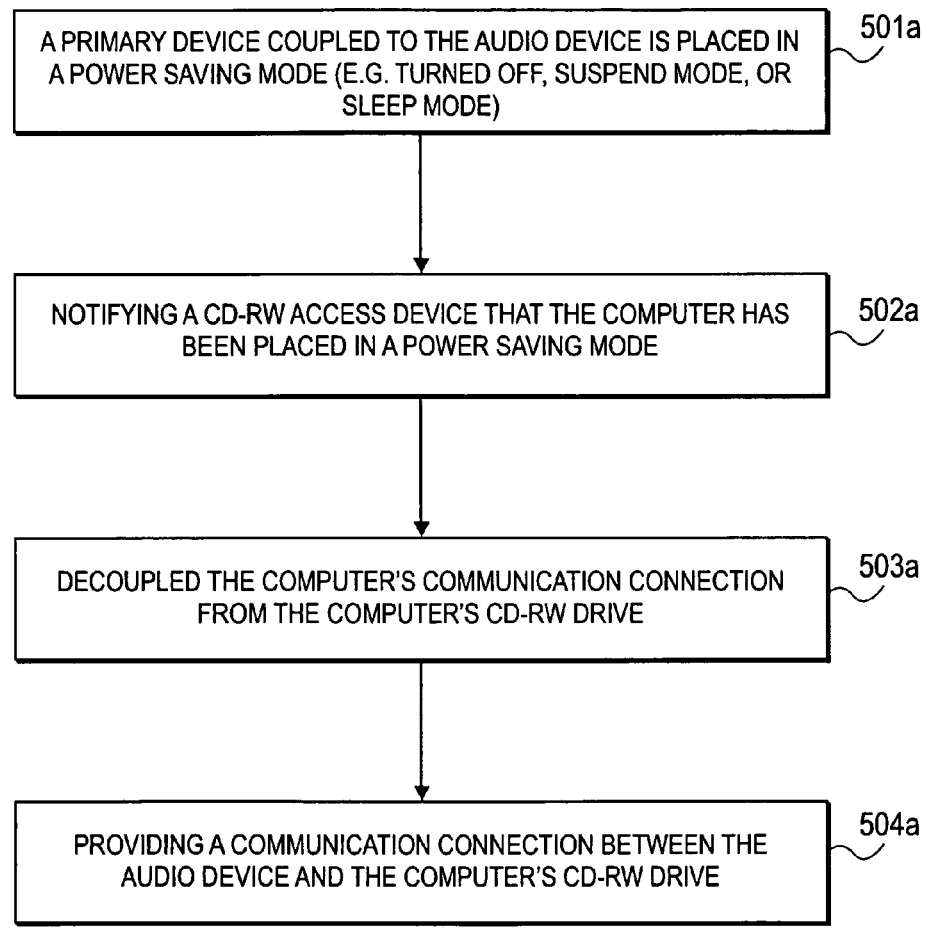
FIG. 5*a* illustrates an embodiment of a method of transferring control of a computer's disk drive to the audio device described.
Figure 5B:
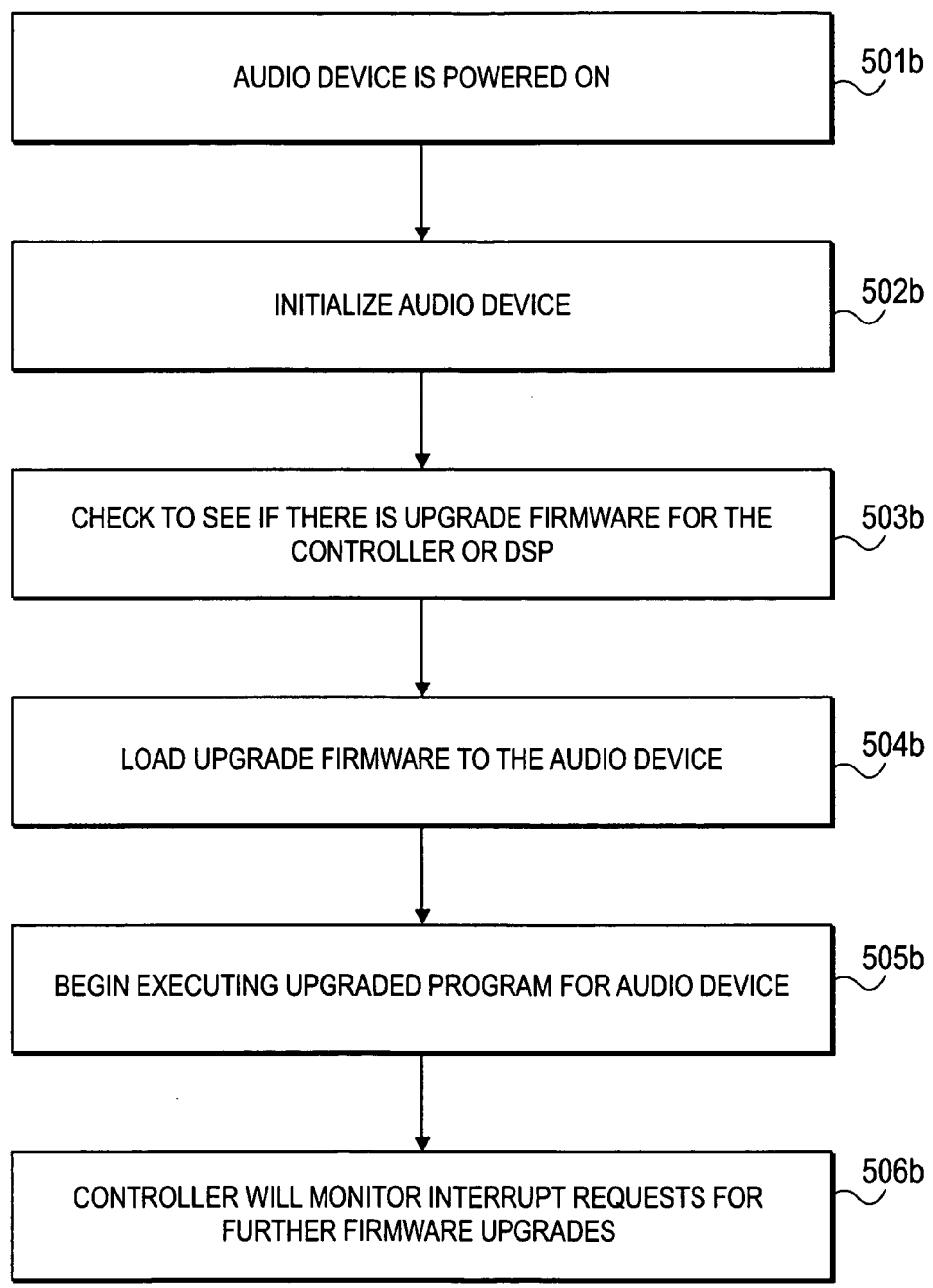
FIG. 5*b* illustrates an embodiment of a method of upgrading the firmware of the audio device described.
Figure 5C:
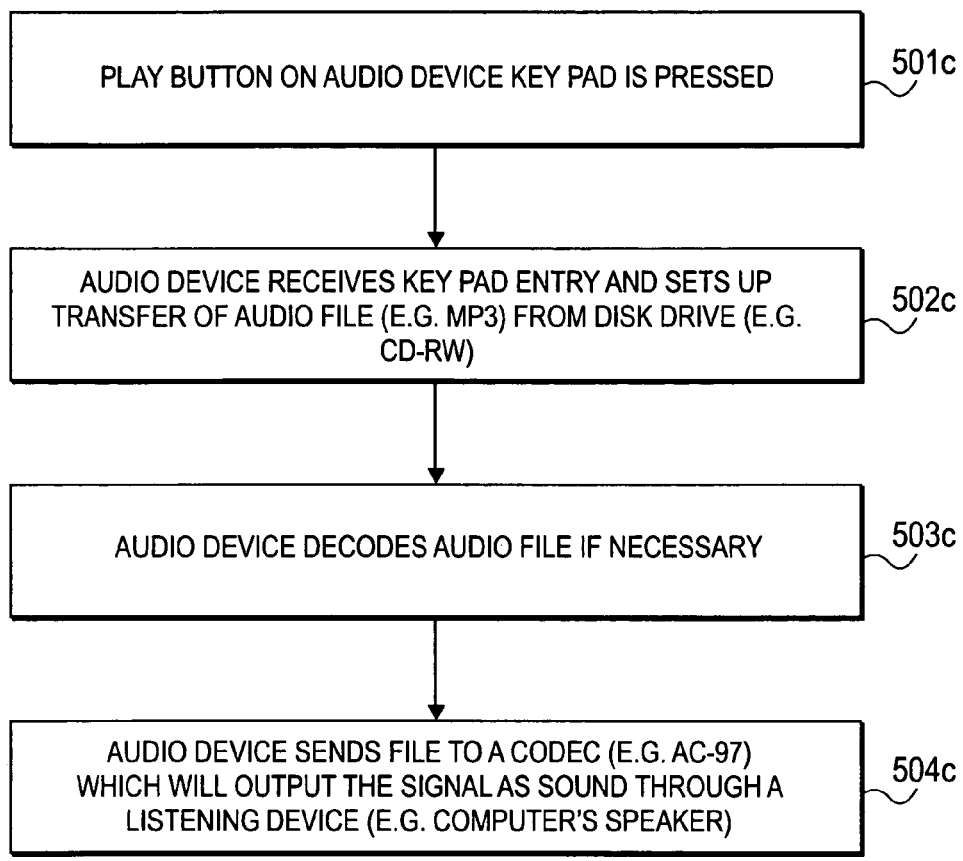
FIG. 5*c* illustrates an embodiment of a method of playing an audio file utilizing the audio device described.
Figure 5D:
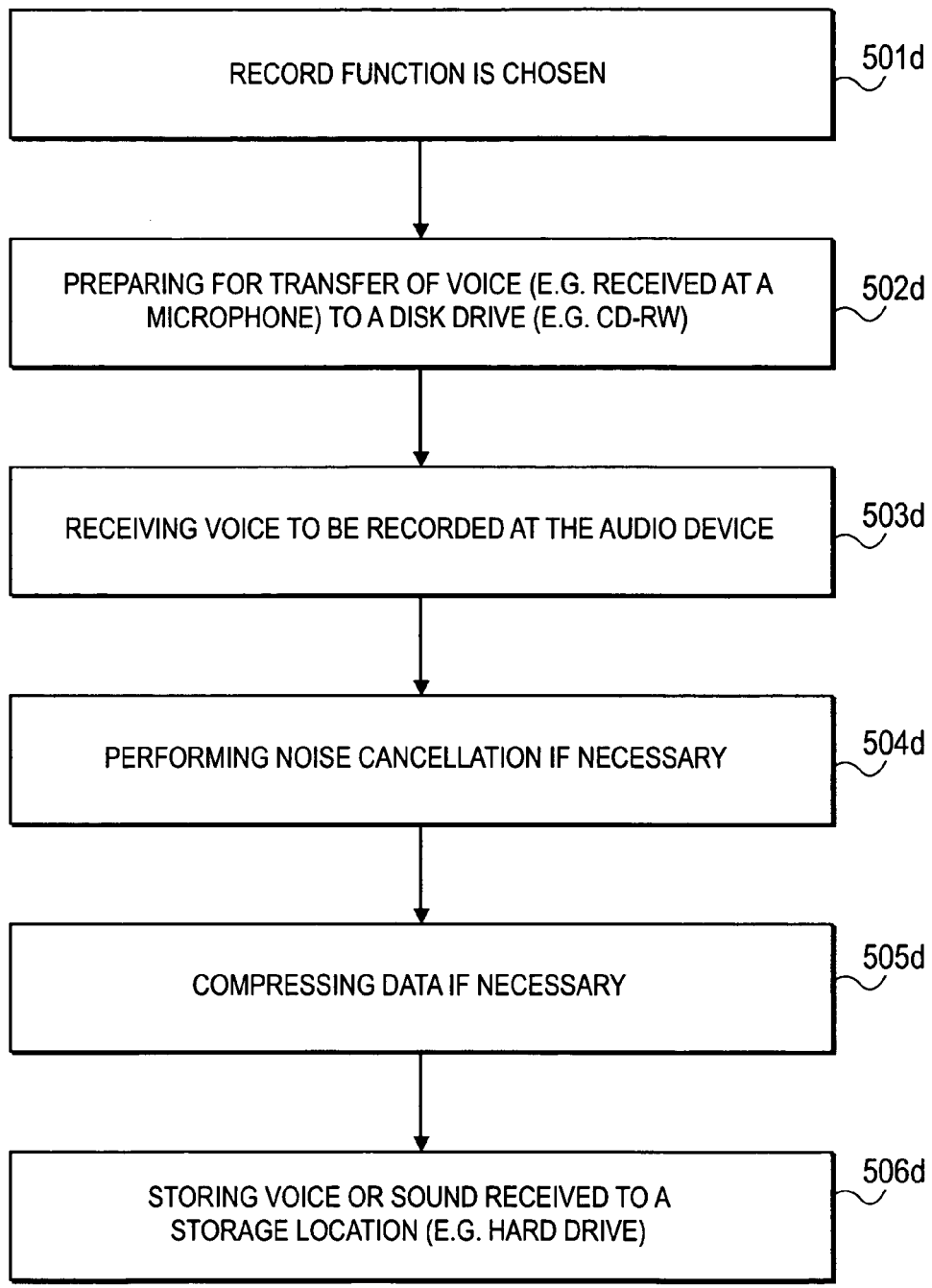
FIG. 5*d* illustrates an embodiment of a method of recording voice utilizing the audio device described.
Figure 5E:
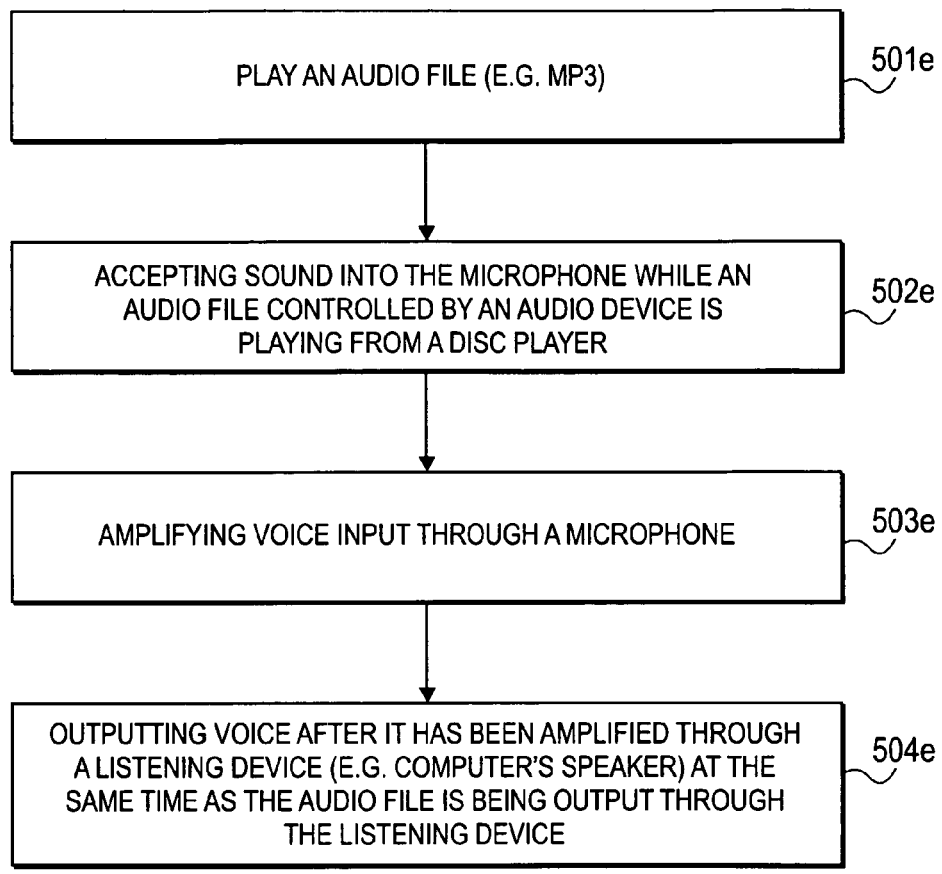
FIG. 5*e* illustrates an embodiment of a method of utilizing the karaoke feature of the audio device described.

Referring to FIG. 4, in one embodiment, a computer (e.g. notebook) is coupled to an audio device 401 through the computer's South Bridge 402. The audio device 401 may be coupled (e.g. through IDE interface 407) to a computer's disk drive 403. In addition, the audio device 401 may be coupled (e.g. through IDE interface 407) to a hard drive 411. Furthermore, in an alternate embodiment the audio device 401 may be coupled to a SmartMedia 412. The disk drive 403 may be internal or external to the computer. FIG. 5*a* illustrates an embodiment of a method of transferring control of a computer's disk drive to the audio device 401 described. FIG. 5*b* illustrates an embodiment of a method of upgrading the firmware of the audio device 401 described. FIG. 5*c* illustrates an embodiment of a method of playing an audio file utilizing the audio device 401 described. FIG. 5*d* illustrates an embodiment of a method of recording voice utilizing the audio device 401 described. FIG. 5*e* illustrates an embodiment of a method of utilizing the karaoke feature of the audio device described. An example of karaoke would be to have a user sing along (e.g. through the computer's microphone) to music being output through the computer's speaker while the user's voice is also output through the computer's speaker.

The following describes one embodiment of the process of transferring control to the audio device 401 included in the system 400 of FIG. 4. Referring to FIG. 4 and FIG. 5a, a computer (e.g. notebook) which is coupled to an audio device 401 through the computer's South Bridge 402 is placed 501a in a power saving mode. Upon placing the computer in a power saving mode, the computer sends a signal to the audio device 401 notifying 502a the audio device 401 that the computer has been turned off or placed in a power saving mode (e.g. sleep/suspend). The audio device 401 responds to the signal sent from the computer's South Bridge 402 by disconnecting 503a the computer's communication connection with the computer's disk drive (e.g. CD-RW drive 403). After disconnecting the computer's connection to the disk drive 403, the audio device 401 provides 504a a communication connection between itself and the computer's disk drive 403. In alternate embodiments, the audio device 401 communicates with the computer's hard drive 411 or SmartMedia 412 instead of the computer's disk drive 403. In further alternate embodiments, the audio device 401 may access the computer's disk drive 403, hard drive 411, or SmartMedia 412.

The following describes one embodiment of the process of upgrading controller firmware and DSP firmware associated with the audio device 401. Referring to FIGS. 4 and 5b, the process begins by powering on 501b the audio device 401 or by resetting the audio device 401. Next, the audio device 401 is initialized 502b. Following initialization of the audio device 401 a check 503b is made to see if there is upgrade firmware for the audio device's 401 controller or DSP. The upgraded firmware is loaded 504b to the audio device 401. After the upgraded firmware has been loaded, the audio device 401 begins executing 505b the upgraded program. If no upgrade has been provided the audio device's 401 controller enters a housekeeping loop where it monitors 506b interrupt requests notifying the audio device's 401 controller of firmware upgrades. The DSP firmware performs DSP functions such as MP3 decoding, noise cancellation etc. The controller firmware handles the data transfer and system functions such as IDE data transfer and USB data transfer.

The next three embodiments of processes cover three functions of the audio device 401 of FIG. 4. The functions covered include playing an audio file (e.g. MP3 format) from a storage location (e.g. hard drive 411), recording voice or sound input at a computer (e.g. notebook computer) microphone to the computer's disk drive and providing a karaoke feature. Referring to FIG. 5c, an embodiment of a method for playing an audio file utilizing the embodiment described is provided. Referring to FIGS. 4 and 5c, to initiate the audio device's 401 playing of an audio file (e.g. MP3) from a disk drive 403, the play button on a keypad 404 attached to the audio device 401 is pressed 501c. In one embodiment, the keypad 404 is a computer keyboard. The audio device 401 receives 502c a signal that the play button has been pressed and sets up the transfer of an audio file (e.g. MP3) from the computer's storage location (e.g. CD-RW 403). The audio device 401 decodes 503c the audio file if necessary. After any necessary decoding the audio file is sent 504c to the codec (e.g. AC97) 405 which outputs the audio file as sound through a listening device (e.g. computer's speaker).

Referring to FIG. 5d, an embodiment of a method of recording voice utilizing the audio device 401 described is provided. Referring to FIGS. 4 and 5d, to initiate the audio device's 401 recording of voice, the record function on a keypad 404 attached to the audio device 401 is chosen 501d. The audio device 401 receives a signal that the record button has been pushed and prepares 502d for the transfer of voice (e.g. received at a computer's microphone) to a disk drive (e.g. CD-RW) 403. The audio device 401 then begins receiving 503d the voice or sound input (e.g. by computer's microphone) from the codec 405. If necessary, the audio device 401 performs 504d noise cancellation. Furthermore, the audio device 401 compresses 505d the data if requested. Next, the voice or sound received at the audio device 401 is stored 506d to a storage location (e.g. hard drive 411).

Referring to FIG. 5e, an embodiment of a method of utilizing the karaoke feature of the audio device 401 described is provided. Referring to FIGS. 4 and 5e, a user would begin playing 501e an audio file. While the audio file controlled by the audio device 401 is playing, the audio device is capable of accepting 502e sound input through the computer's microphone. The sound received at the microphone is then amplified 503e before it is output. After being amplified, the sound is output 504e through a listening device (e.g. computer's speaker) at the same time as the audio file being played is output through the listening device.

Figure 6A:
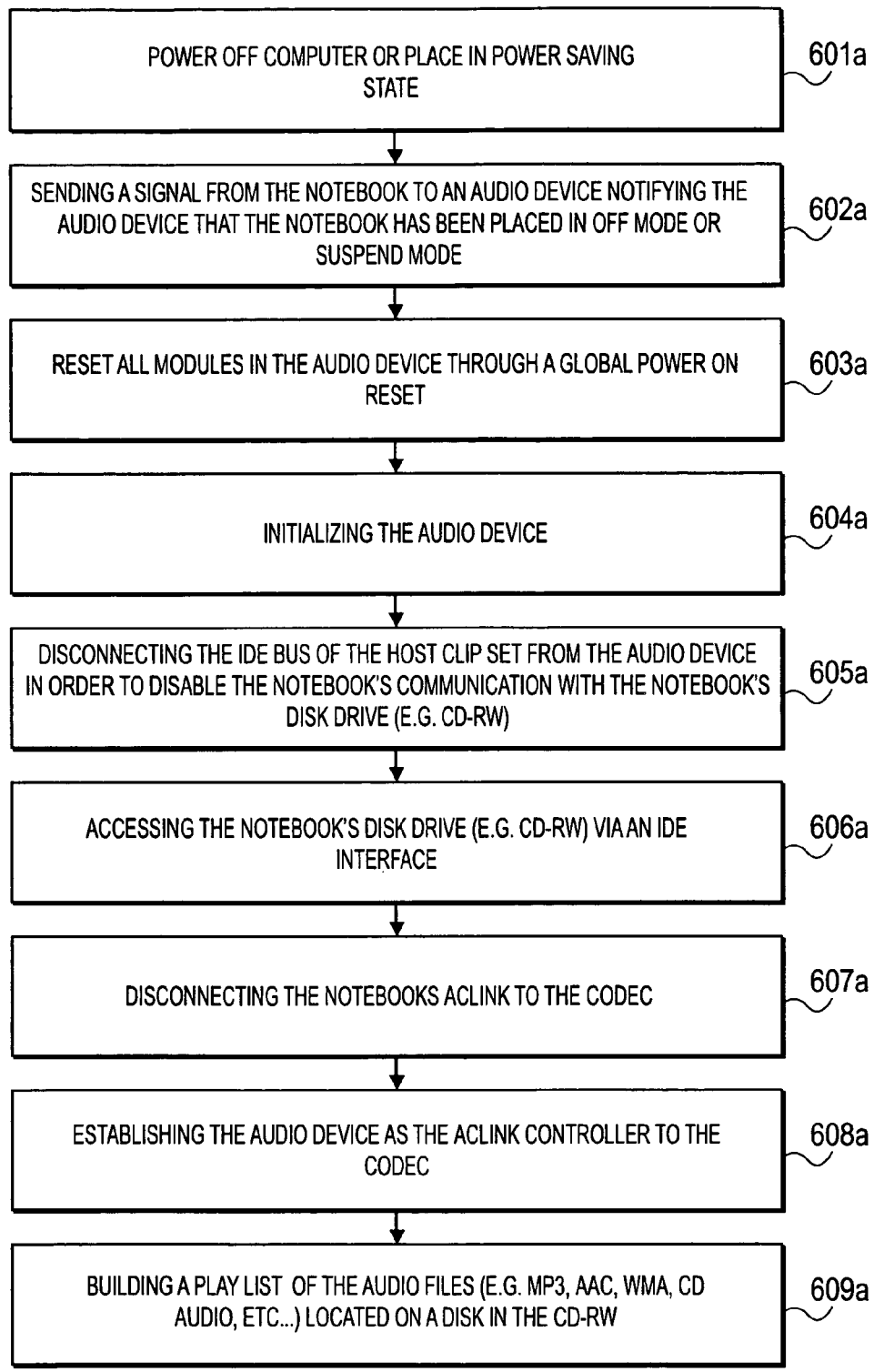
FIG. 6*a* illustrates an embodiment of a method of transferring control from the computer to the audio device.

Referring briefly back to FIG. 4, an embodiment of the architecture described within a system is illustrated. Referring briefly back to FIG. 5a, an embodiment of a method of transferring control of a computer's disk drive to the audio device described is illustrated. Referring to FIG. 6a, an embodiment of a method of transferring control from a primary device (e.g. notebook computer) to the audio device is illustrated. The audio device's 401 interfaces include but are not limited to Host South Bridge (e.g. H_IDE) 406, IDE disk drive (e.g. C_IDE) 407, keypad I/O 408, and CODEC 409 interfaces.

Referring to FIGS. 4 and 6a, the method for transferring audio control from the primary device (e.g. notebook computer) to the audio device 401 is initiated by powering off 601a the primary device (e.g. notebook computer) or placing the primary device in a power saving mode (e.g. power off, sleep mode, or suspend mode). In response to being placed in a power saving mode, a signal, such as a single wire signal for example is sent 602a from the primary device's South Bridge 402 to an audio device 401, notifying the audio device 401 that the primary device 401 has been placed in a power saving mode. In response to the signal sent from the primary device, all the modules in the audio device 401 are reset 603a through a global power on reset or other suitable signal.

Figure 6B:
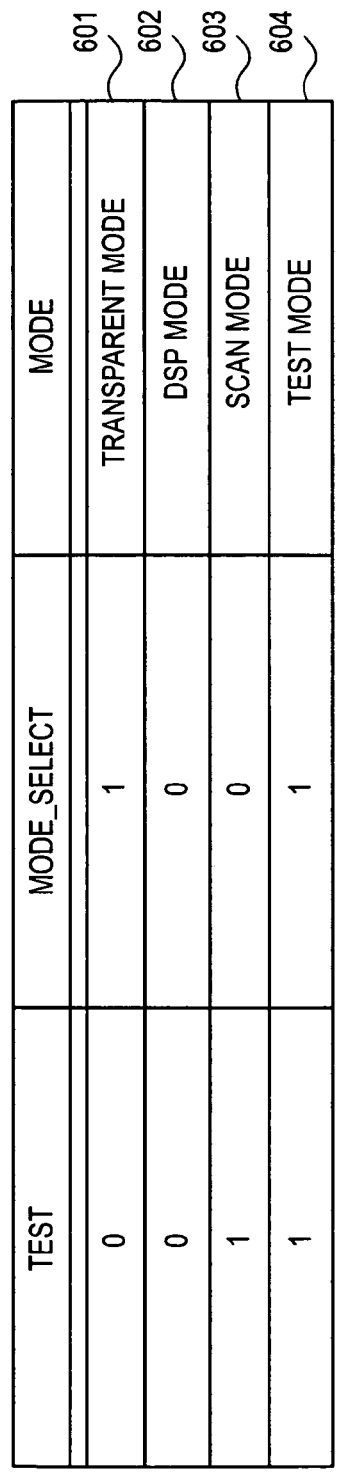
FIG. 6*b* illustrates a table of the four operational modes described.

In one embodiment of the audio device architecture, the audio device 401 has four operational modes. They are selected during the chip reset through the use of two input pins (e.g. TEST and MODE_SELECT 415 in one embodiment). The four modes are shown in FIG. 6b. In transparent mode 601b, the audio device 401 is transparent to the primary device (e.g. notebook computer), the IDE signals from the South Bridge 402 are passed directly through the audio device 401 to the disk drive (e.g. CD-RW) 403 and vice versa. The same is true for AC link 409 to the codec 405. Thus, the audio device 401 remains in the reset state. In DSP mode 602b, the audio device 401 is used to play audio files (e.g. MP3) and to handle other functions, transferring control of those duties from the primary device (e.g. notebook computer). When the audio device's 401 DSP mode 602*b* is selected, after the reset, the controller (e.g. 8051 controller) starts execution from the internal ROM. In one embodiment of the architecture described, the controller is an 8051 controller.

The built-in 8051 controller is mainly designed to be an on chip host processor for the audio device's DSP. The 8051 serves as the controller for the interface modules such as Host IDE 406, CD IDE 407, USB 414, I2C 413, etc. . . Also, the 8051 handles user interface functions. The 8051 controller has a limited operating clock frequency of up to 50 MHz. However, when the USB module is in operation this may be reduced to 48 MHz.

After the controller starts execution from the internal ROM, the controller is responsible for startup and coordinates the operation of the audio device 401 through the execution of controller firmware. The Scan mode 603*b* and Test mode 604*b* are used to scan and test the audio device 401. In one embodiment, neither the Scan mode 603*b* nor the Test mode 604*b* should be selected during normal usage.

Next, the audio device 401 is initialized 604*a*. The audio device 401 automatically configures itself with standard functions. After the audio device 401 is initialized, it disconnects 605*a* the Host South Bridge IDE bus 406 from the host chip set. In one embodiment, the audio device 401 is connected between the Host South Bridge IDE 406 and the CD-ROM or CD-RW IDE 407. During normal PC operation the audio device 401 is in transparent mode 601*b* and the computer (e.g. notebook) accesses a storage location (e.g. CD-RW 403) as if the audio device 401 does not exist. After disconnecting 605*a* the IDE bus from the host chip set the audio device 401 accesses 606*a* a disk drive 403 on the IDE bus 407 directly. In alternate embodiments, the audio device 401 accesses a hard drive 411. In other alternate embodiments, the audio device 401 accesses a SmartMedia 412.

In addition to establishing a connection to the disk drive 403 via the IDE bus 407, the audio device 401 also disconnects 607*a* the ACLINK 409 from the host's South Bridge 402. After disconnecting the ACLINK 409 from the South Bridge 402, the audio device 401 is established 608*a* as the ACLINK controller to the codec 405. The decoded audio is sent to the codec 405. As part of transferring control from the primary device to the audio device 401, the storage location (e.g. CD-RW 403) directory is traversed and a play list of audio files (e.g. MP3) is built 609*a* in alphabetical sequence. Normal audio CD (CD_DA format) is also supported. In the case of CD_DA format, playback is by track number as with a regular audio CD. Next to be examined is a more detailed discussion related to upgrading the audio device's 401 firmware.

Figure 7A:
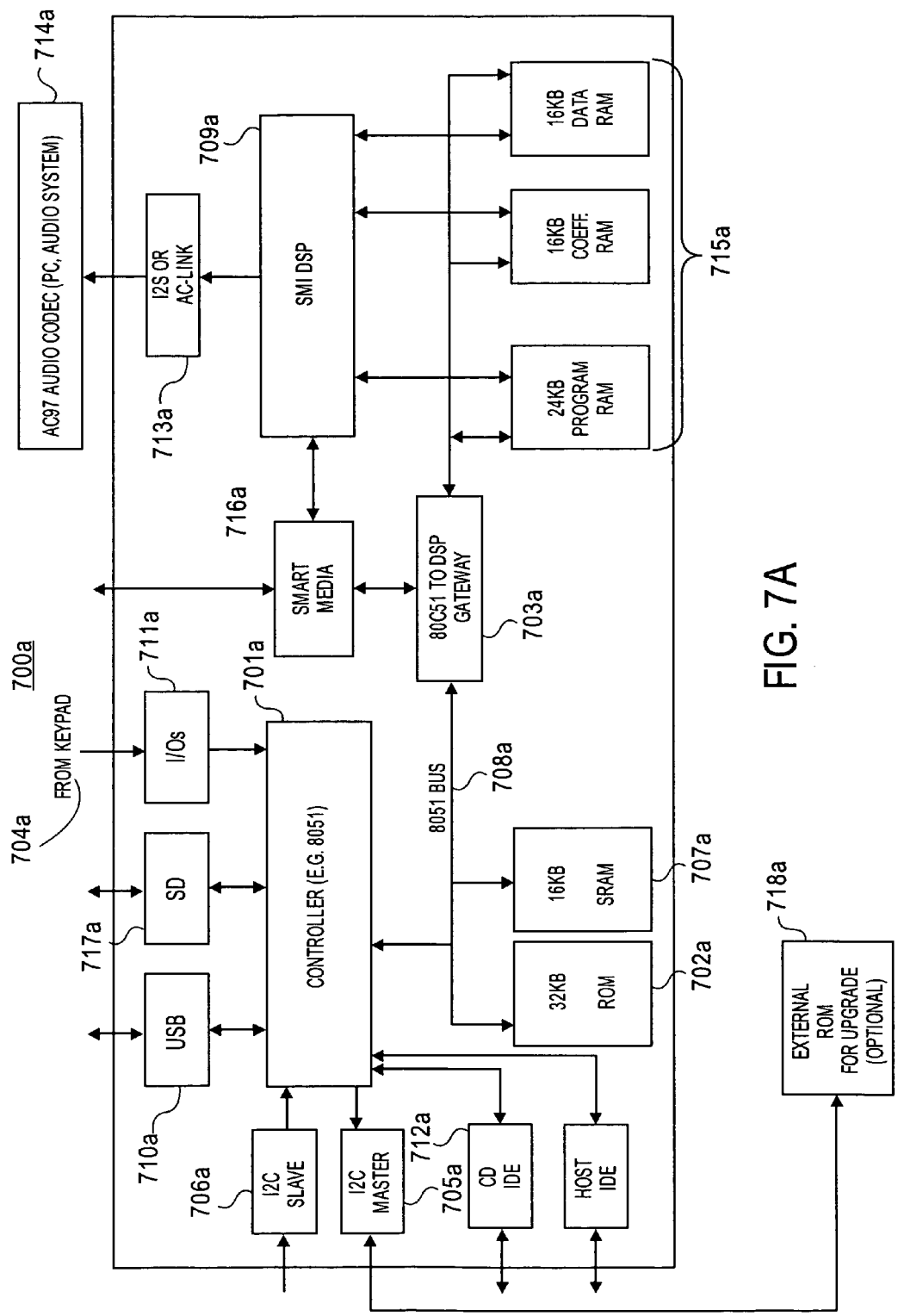
FIG. 7*a* illustrates an alternate embodiment of the audio device of FIG. 4.

As discussed above and illustrated in FIG. 6*a*, the audio device 401 is initialized during the power up process. During initialization checks are made to determine if there is an upgrade for the audio device's 401 controller and DSP firmware. In one embodiment, the audio device's 401 firmware can be upgraded in three ways: an external upgrade ROM, through an I2C interface, and through a USB interface. Referring briefly back to FIG. 4, an embodiment of the architecture disclosed within a system is illustrated. FIG. 7*a* illustrates an alternate embodiment of the audio device of FIG. 4. Referring briefly back to FIG. 5*b*, an embodiment of a method of upgrading the firmware of the audio device described is illustrated. An alternate embodiment of a method of upgrading controller and DSP firmware is illustrated in FIG. 7*b*.

Figure 7B:
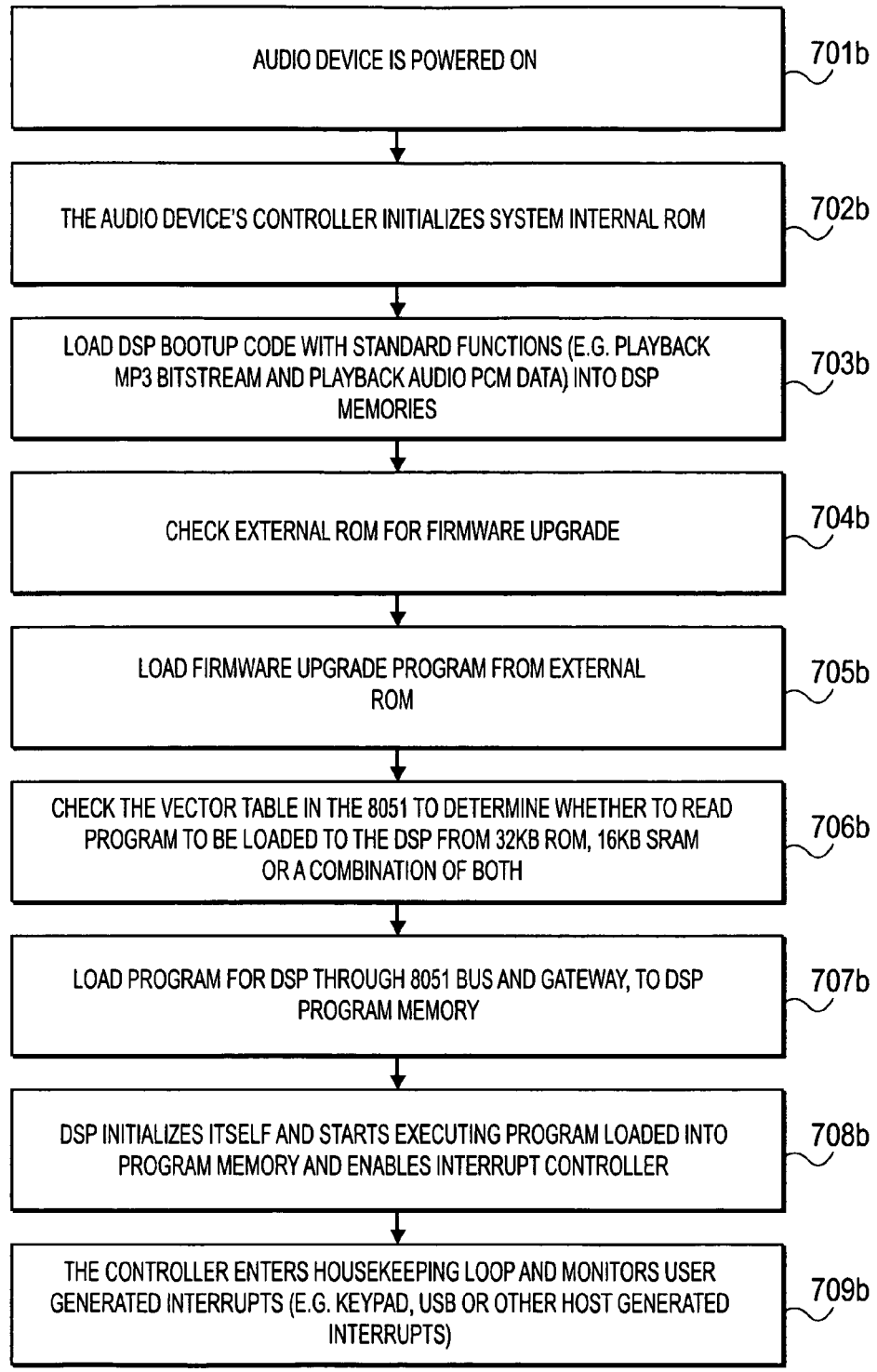
FIG. 7*b* illustrates an alternate embodiment of a method for upgrading controller and DSP firmware.

Referring to FIGS. 7*a* and 7*b*, the audio device 700*a* is powered on 701*b*. Next, the controller (e.g. 8051) 701*a* initializes 702*b* system internal ROM 702*a*. The controller firmware program then loads 703*b* DSP boot-up code with standard functions from an internal ROM 702*b* through the Controller to the DSP gateway 703*a* into DSP memories 715*a*. The DSP standard functions include but are not limited to Playback MP3 bitstream and Playback audio PCM data. After loading the DSP bootup code, the controller 701*a* checks 704*b* an external ROM 718*a* for a firmware upgrade. The external ROM 718*a* is accessed through the audio device's 700*a* master mode I2C port 705*a*. If a valid upgrade is found in an external ROM 718*a*, then the controller 701*a* loads 705*b* data from the external ROM 718*a* in through the I2C port 705*a*, and into an SRAM 707*a*. In alternate embodiments the SRAM 707*a* may be a register. In one embodiment the internal ROM 702*a* which contains the DSP bootup code is not re-writeable.

After the new code is loaded to the SRAM 707*a*, the controller 701*a* checks 706*b* its vector table to determine whether the DSP program to be loaded to DSP memory 715*a* is located in the internal ROM 702*a*, SRAM 707*a*, or a combination of both. Next, the controller 701*a* reads the upgrade program from the SRAM 707*a* and loads 707*b* the upgrade program through the controller Bus (e.g. 8051 Bus) 708*a* and gateway 703*a* to DSP program memory 715*a*. Next, the DSP 709*a* initializes 708*b* itself and starts executing the program loaded into DSP program memory 715*a*. The controller 701*a* at this point enters 709*b* into the main loop and monitors user-generated interrupts. While the audio device 700*a* is in use, the audio device's 700*a* firmware can be updated any time by a host processor in the system through the use of either the I2C port 706*a* or USB port 710*a*. During execution of the DSP program, when an interrupt request occurs, the controller 701*a* begins to execute the interrupt service routine. After the interrupt has been serviced, the DSP 709*a* continues program execution.

Figure 7C:
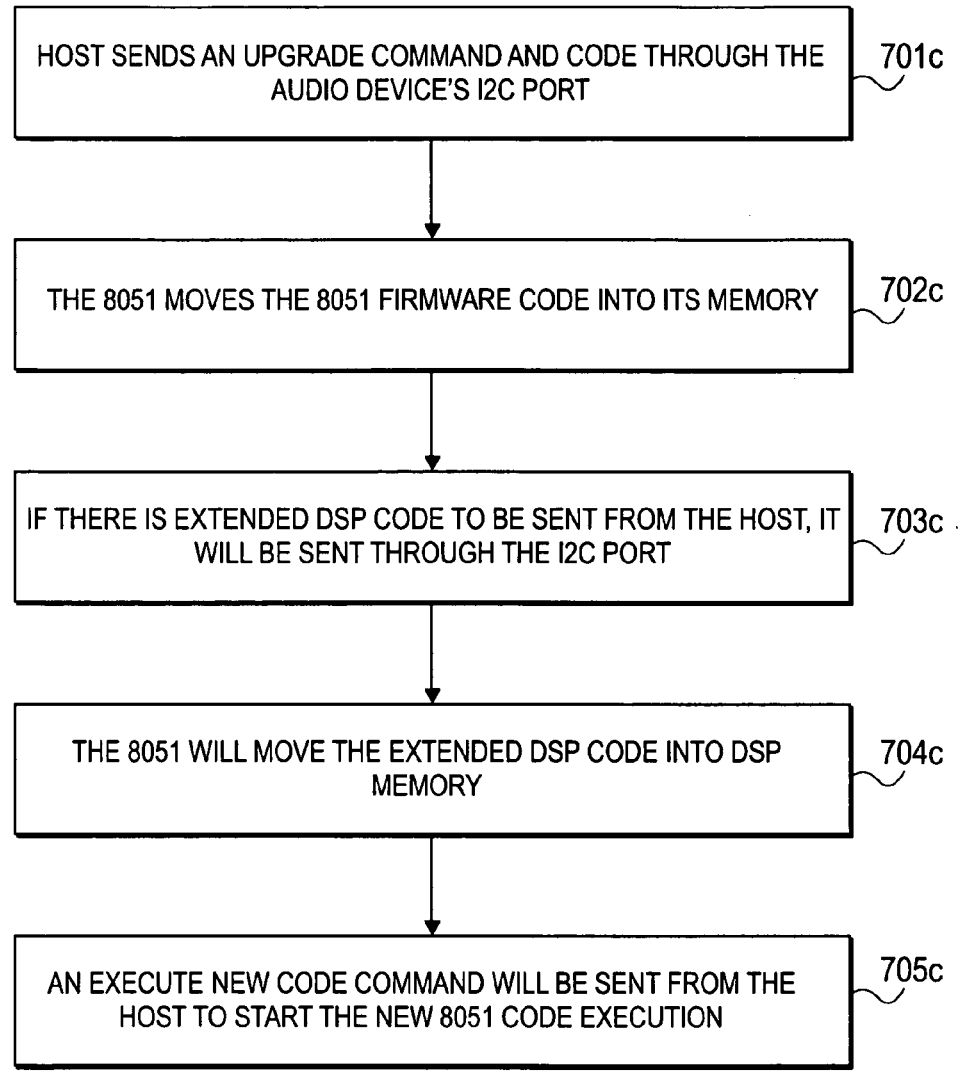
FIG. 7*c* illustrates an embodiment, of a method for upgrading the firmware of the embodiment described through a I2C port.

Referring to FIG. 7*c*, an embodiment of a method for upgrading the firmware of the embodiment described through an I2C port 706*a* is illustrated. Referring to FIGS. 7*a* and 7*c*, the upgrade through the I2C port 706*a* is initiated by the host sending 701*c* an upgrade command and code through I2C port 706*a*. The controller (e.g. 8051) 701*a* then moves 702*c* the 8051 firmware code into SRAM memory 707*a*. If there is extended DSP code to be sent 703*c* from the host it is sent through the I2C port 706*a*. The controller 701*a* moves 704*c* the extended DSP code into DSP memory 715*a*. After the 8051 firmware and DSP code is received, the host sends 705*c* an execute new code command to start the new 8051 code execution.

Figure 7D:
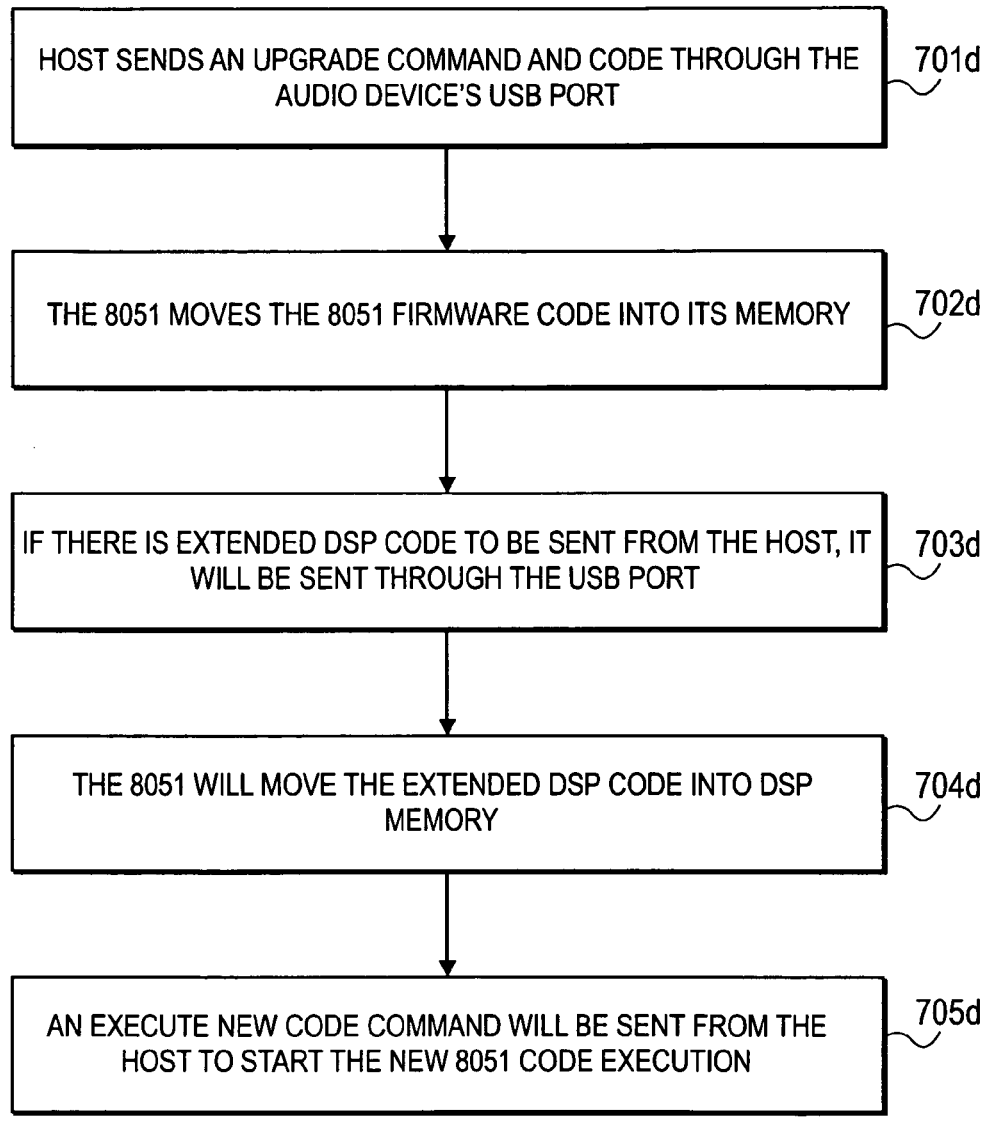
FIG. 7*d* illustrates an embodiment, of a method for upgrading the firmware of the embodiment described, through a USB port.

Referring to FIG. 7*d*, an embodiment of a method for upgrading the firmware of the embodiment described, through the USB port 710*a* is illustrated. Referring to FIGS. 7*a* and 7*d*, the upgrade through the USB port 710*a* is initiated when the host sends 701*d* an upgrade command and code through the USB port 710*a*. The controller 701*a* copies 702*d* the 8051 firmware code into SRAM memory 707*a*. If there is extended DSP code to be sent from the host it is be sent 703*d* through the USB port 710*a*. The controller 701*a* copies 704*d* the extended DSP code into DSP memory 715*a*. After the 8051 firmware and DSP code is received, the host sends 705*d* an execute new code command to start the new 8051 code execution.

Figure 8A:
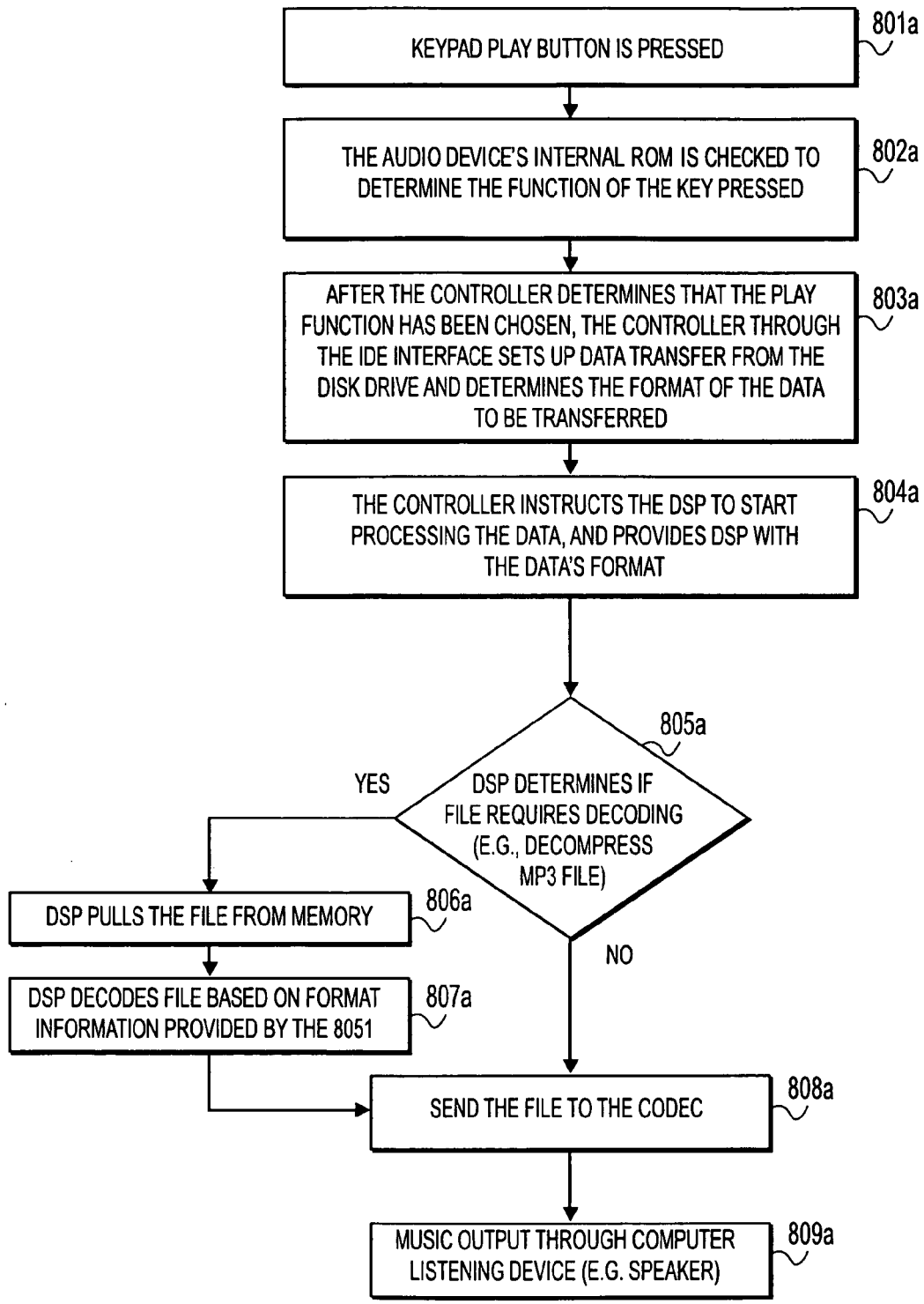
FIG. 8*a* illustrates an alternate embodiment of a method for playing an audio file from a primary device's disk drive utilizing the embodiment described.

Referring briefly back to FIG. 5*c*, an embodiment of a method of playing an audio file utilizing the audio file described is illustrated. Referring to FIG. 8*a*, an alternate embodiment of a method for playing an audio file from a primary device's disk drive utilizing the embodiment described is illustrated. In an alternate embodiment the audio device may play an audio file from a hard drive. Referring to FIGS. 7a and 8a, to initiate the playing of audio files the play button on the audio device's 700a attached keypad 704a is pressed 801a. Next, the audio device's 700a internal ROM 702a is checked 802a to determine the function of the keypad entry received at the audio device's 700a I/O port 711a.

In one embodiment, the audio device 700a has eight pins dedicated for a push-button keypad. These eight inputs are directly connected to an I/O port 711a of the built-in controller (e.g. 8051) 701a. In addition, the eight pins are OR'ed together to generate an interrupt signal. If any keypad entry is pressed, the signal goes low (active) and an interrupt is generated. Referring to FIG. 8b, a table of the functions associated with each keypad entry is illustrated. The audio device's 700a internal ROM 702a defines the functionality of the eight keypads. According to FIG. 8b, key2 801b is associated with the play button on the keypad 404. The function of key2 801b is to toggle between the playing and pausing of an audio file.

After the controller 701a determines that the play function has been chosen, the controller 701a through the IDE interface 712a sets up 803a data transfer from the disk drive (e.g. CD-RW) 403 and determines the format (e.g. MP3) of the data to be transferred. The controller 701a instructs 804a the audio device's 700a DSP 709a to begin processing the data and provides the DSP 709a with the data's format. The DSP 709a determines 805a if the data requires decoding (e.g. decompress MP3 file). If the data needs to be decoded, the DSP 709a begins pulling 806a the file data from memory. The DSP 709a then decodes 807a the file based on format information provided by the controller 701a. Whether the data requires decoding (e.g. MP3 file) or not (e.g. CD_DA format), after the DSP 709a has finished processing the data, it sends 808a the audio output through an I2S or AC-link 713a to a codec 714a. Next, the signal is output 809a as music through a listening device (e.g. computer's speaker).

Figure 8C:
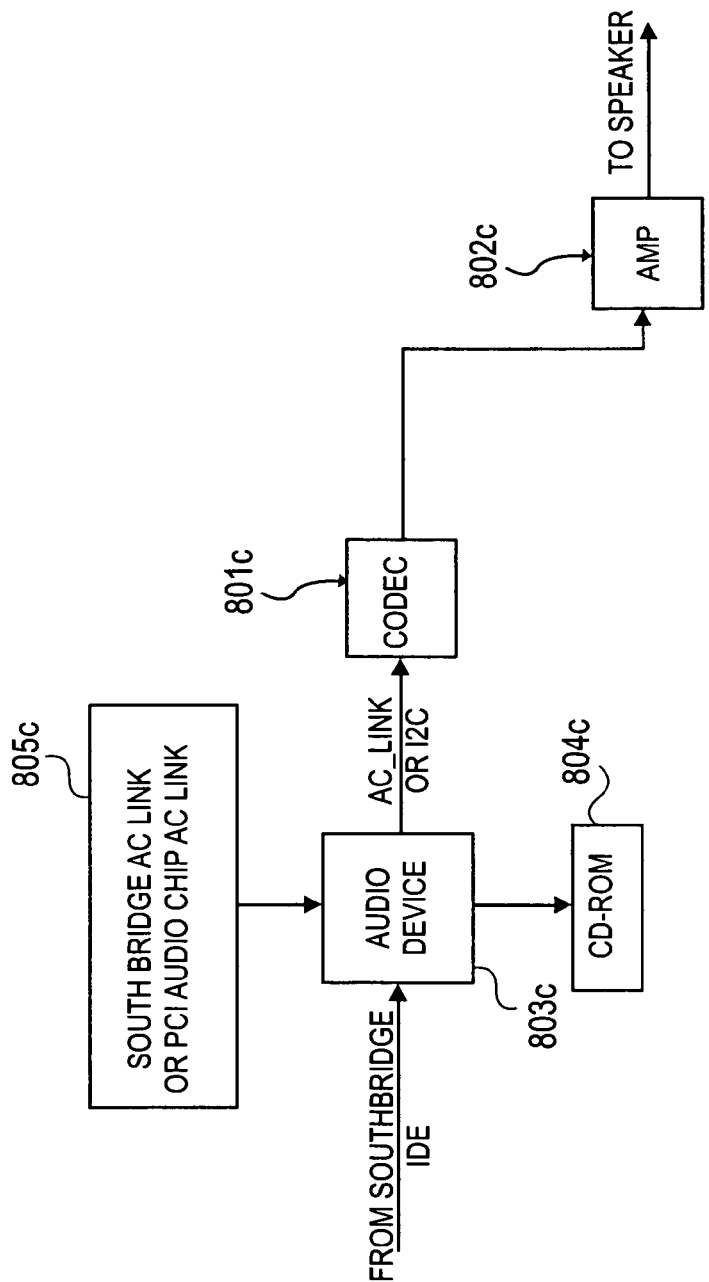
FIG. 8*c* illustrates an architecture of the embodiment described within a computer (e.g. notebook) audio system.

Referring back to FIG. 4, an audio device 401 within a computer system is provided. FIG. 8c provides one embodiment of the audio device 401 of FIG. 4 within a computer (e.g. notebook) audio system. The audio device 803c is coupled to the computer's South Bridge 805c, a CD-ROM 804c, and a CODEC 801c. Referring to FIG. 8c, the codec's 801c digital to analog converter (DAC) converts the digital audio signal to an analog signal. The analog signal is then forwarded to an amplifier 802c where the strength of the analog signal is boosted. After the signal has been amplified it is sent to a listening device (e.g. speaker).

Figure 9:
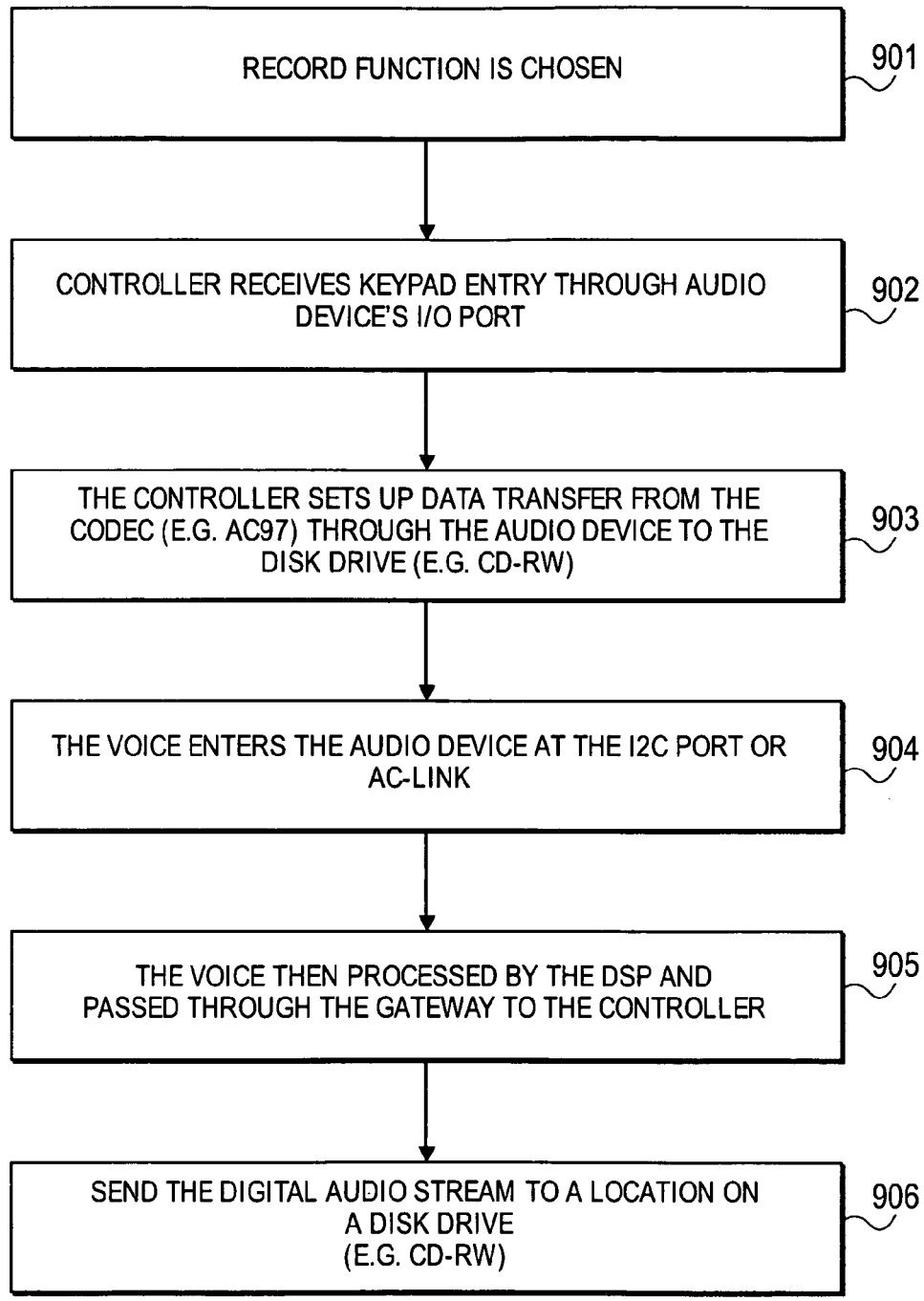
FIG. 9 illustrates an alternate embodiment of a method of recording voice utilizing the embodiment described.

In an embodiment of the architecture described, recording voice received through a microphone attached to the computer is possible. Referring briefly back to FIG. 5d, an embodiment of a method of recording voice utilizing the audio device described is illustrated. Referring to FIG. 9, an alternate embodiment of a method of recording voice utilizing the embodiment described is illustrated. Referring to FIGS. 7a and 9, the record function is chosen 901 from a keypad attached to the audio device 700a. The audio device 700a receives 902 the keypad entry at an I/O port 711a and forwards the keypad entry to the audio device's controller 701a. After the controller 701a determines that the keypad entry chosen is the record function, the controller 701a sets up 903 data transfer from the codec (e.g. AC97) 714a through the audio device 700a to a disk drive (e.g. CD-RW) attached to the audio device 700a through an IDE interface 712a. In an alternate embodiment, a hard drive or a Smart-Media is used in place of a disk drive. The SmartMedia interface 716a may be used to communicate with a Smart-Media. Also, the SD flash controller 717a may be used to communicate with an SD flash memory. The voice to be recorded enters 904 the audio device 700a from the codec 714a at an I2S port or AC-link 713a. The voice is then processed 905 by the audio device's 700a DSP 709a and passed through the controller to DSP gateway 703a to the audio device's controller 701a. The controller 701a sends 906 the voice through an IDE interface 712a to an attached disk drive. In alternate embodiments, the controller 701a sends the voice through an interface to an attached hard drive.

Figure 10:
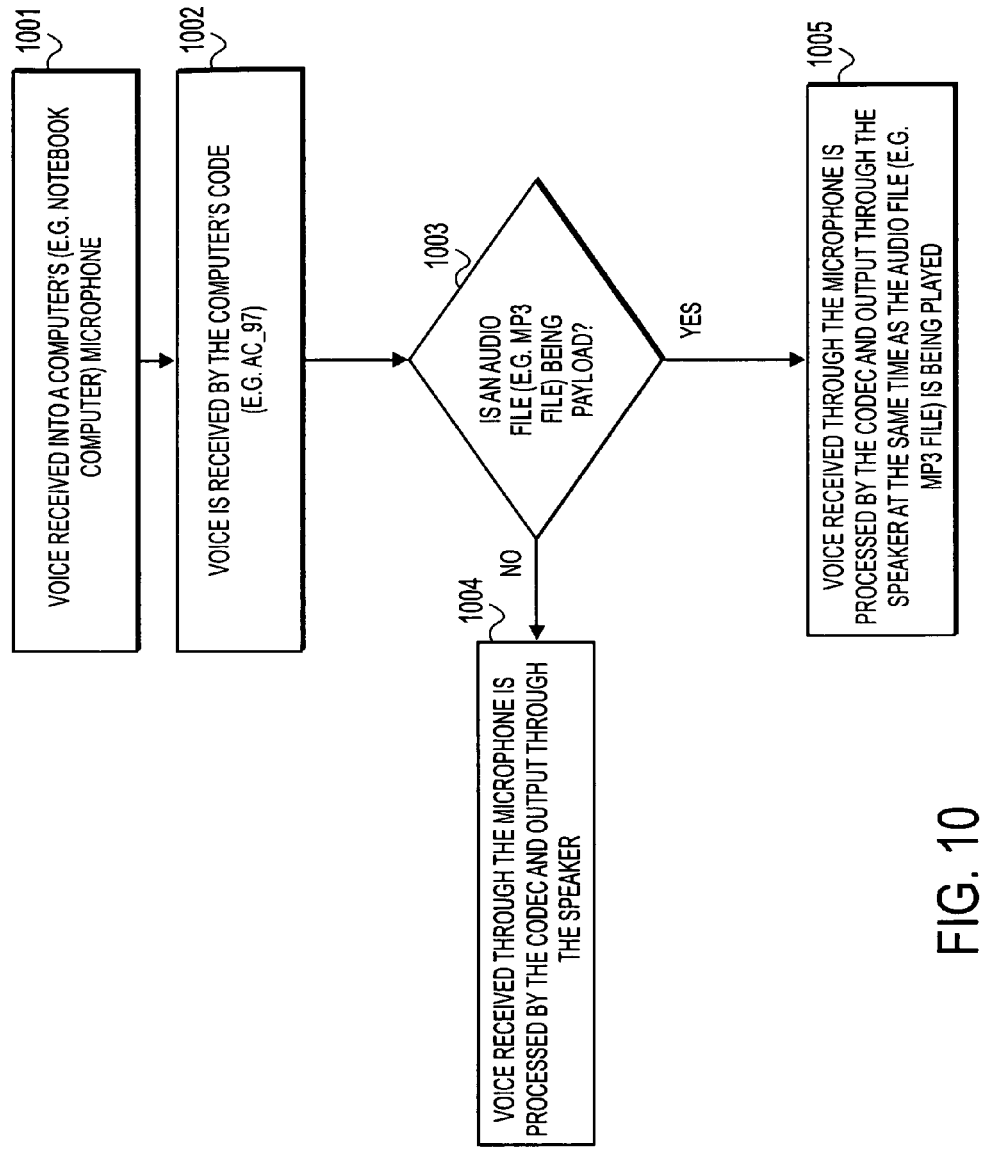
FIG. 10 illustrates an alternate embodiment of a method of utilizing the karaoke feature of the embodiment described.

In addition to recording voice the audio device also has in one embodiment, a karaoke feature. This feature provides for the playing of music utilizing the audio device's play feature described in FIGS. 5c and 8a while voice received through a microphone attached to the primary device is output at the same time. Referring briefly back to FIG. 5e, an embodiment of a method of utilizing the karaoke feature of the audio device described is illustrated. Referring to FIG. 10, an alternate embodiment of a method of utilizing the karaoke feature of the embodiment described is illustrated.

Referring to FIGS. 7a and 10, voice is received 1001 into a computer's microphone at the same time that the audio device's play function is being utilized. The voice is received 1002 into the computer's Codec (e.g. AC97) 714a. In step 1003 a check to determine if the audio device is currently playing an audio file is made. In step 1004, if the audio device is not currently playing an audio file, voice received through the microphone is processed by the CODEC and output through the speaker. In step 1005, voice received through the microphone is processed by the Codec 714a, mixed with the audio file, and output through a listening device (e.g. computer speaker) at the same time as the audio file being played is being output through the attached computer.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 4 may be integrated into components, or may be subdivided into components. Moreover, the blocks of FIGS. 5a, 5b, 5c, 5d, 5e, 6a, 7b, 7c, 7d, 8a, 9, and 10 represent portions of methods which, in some embodiments, may be reordered or may be organized in parallel rather than in a linear or step-wise fashion. The present specification and figures are accordingly to be regarded as illustrative rather than restrictive.

What is claimed is:

1. A method comprising:
    recognizing that a primary device attached to a storage location has been placed in a power saving mode;
    switching file access control of the primary device's storage location from the primary device to an audio device after the primary device has been placed in a power saving mode; and recording audio files to the primary device's storage location while the primary device is in the power saving mode, wherein the recording includes processing a sound by a digital signal processor (DSP); and passing a processed sound from the DSP through a controller-to-DSP gateway to a microcontroller to send to the primary device's storage location.

2. The method of claim 1 further comprising, the primary device sending a signal to the audio device to alert the audio device that the primary device has been placed in a power saving mode.

3. The method of claim 1 further comprising, switching control of the primary device's storage location and the primary device's CODEC to the audio device upon a user request, while the primary device is not in a power saving mode.

4. A method as in claim 1, wherein the audio device is installed within the primary device.

5. A method as in claim 1, wherein the audio device is external to the primary device.

6. A method as in claim 5, wherein the audio device is coupled to the primary device through a USB connection.

7. A method as in claim 1, wherein the primary device comprises a laptop computer.

8. A method as in claim 1, wherein the audio device includes an interface to a CODEC, which is a combination of hardware and software that converts analog sound, speech and/or video to digital code (analog to digital) and also converts digital code to analog sound, speech and/or video (digital to analog).

9. A method as in claim 1, wherein the audio device includes an interface to a CODEC, which is hardware that converts analog sound, speech and/or video to digital code (analog to digital) and also converts digital code to analog sound, speech and/or video (digital to analog).

10. A method as in claim 1, wherein the audio device includes an interface to a CODEC, which is a medium including data that when accessed by the audio device, cause the audio device to convert analog sound, speech and/or video to digital code (analog to digital) and also converts digital code to analog sound, speech and/or video (digital to analog).

11. A method comprising:

searching a storage location for a digital signal processor (DSP) boot program;

providing the DSP with the boot program;

searching for updates to the DSP boot program;

providing the DSP with the updates for the DSP boot program, wherein the providing includes checking a vector table to determine whether to read the updates for the boot program to be loaded to the DSP from an internal ROM, a SRAM, or a combination of both; and after the checking, loading the updates for the boot program through a controller-to-DSP gateway to a DSP program memory.

12. A method as in claim 11 further comprising searching a storage location for the DSP boot program with a microcontroller.

13. A method as in claim 11 further comprising searching for the updates to the DSP boot program with a microcontroller.

14. A method as in claim 11 further comprising searching the internal ROM for the DSP boot program.

15. A method as in claim 11 further comprising searching the SRAM for the updates to the DSP boot program.

16. A method as in claim 11 further comprising searching an external ROM for the updates to the DSP boot program.

17. A method of processing an audio file located on a primary device's storage location comprising:

accepting a user request at a keypad;

converting the user request to an entry code;

transmitting the entry code to an audio device;

determining the function of the entry code at the audio device;

processing the audio file on the primary device's storage location, which is attached to a primary device, according to the function determined at the audio device, wherein the function includes recording a sound to the primary device's storage location, and providing a karaoke feature while the primary device is in the power saving mode, wherein the recording includes processing the sound by a DSP, and passing a processed sound from the DSP through a controller-to-DSP gateway to a microcontroller to send to the primary device's storage location.

18. The method of claim 17 wherein processing the audio file on the primary device's storage location according to the function recording sound to the primary device's storage location determined at the audio device comprises:

accepting a user request to record sound to a storage location, where the storage location is attached to the primary device;

transmitting the user request to record sound to a microcontroller;

accepting sound into a microphone;

receiving the sound accepted into the microphone into a CODEC;

converting the sound from an analog stream at the CODEC to a digital stream;

transmitting the digital stream from the CODEC to a digital interface;

receiving the digital stream from the digital interface into a DSP;

performing noise cancellation if necessary;

compressing the digital stream if necessary; and writing the digital stream to a storage location.

19. The method of claim 17 wherein processing the audio file on the primary device's storage location according to the function determined at the audio device comprises:

transferring control of voice input to a primary device's microphone from a primary device to an audio device;

accepting sound into the microphone while an audio file controlled by an audio device is playing from a storage location;

amplifying the voice input at the microphone; and outputting the voice after it has been amplified through a speaker at the same time the audio file being played is having its sound output through the speaker.

20. A method as in claim 17 further comprising comparing the entry code against a table of functions related to keypad entries when determining the function related to a keypad entry code.

21. A method as in claim 17 wherein the entry code comprises an entry in a table of entry codes, the table of entry codes further including corresponding functions associated with each entry code.

22. A method as in claim 17 wherein the audio file has a CD audio format.

23. A method as in claim 17 wherein the audio file has an MP3 format.

24. A method as in claim 17 wherein the audio file has a WAV format.

25. A method as in claim 17 wherein the audio file has an AAC format.

26. An apparatus comprising:
a micro-controller;
an input device coupled to the microcontroller, to receive user entries control a primary device's audio device when the primary device is in a power saving state;
an interface to the micro-controller, the interface to provide the micro-controller with access to a storage location, wherein the storage location is attached to the primary device;
a gateway coupled to the micro-controller;
a DSP coupled to the micro-controller through the gateway, wherein the DSP to read user requested files, decode user requested files, and to pass a decoded user requested files through the gateway to the micro-controller to write to user files to the storage location when the primary device is in the power saving state; and
an input/output port coupled to the DSP, the input/output port to transmit a decoded audio stream out of the DSP and receive a digital signal into the DSP.

27. The apparatus of claim 26 wherein the interface is an IDE interface.

28. The apparatus of claim 26 wherein the storage location is a hard drive.

29. The apparatus of claim 26 wherein the storage location is a CD-RW drive.

30. The apparatus of claim 26 wherein the storage location is a flash memory.

31. The apparatus of claim 30 wherein the flash memory is a SmartMedia.

32. The apparatus of claim 26 wherein the primary device is a notebook computer.

33. The apparatus of claim 26 wherein the primary device is an audio jukebox.

34. An apparatus as in claim 26 further comprising a USB interface coupled to the micro-controller.

35. An apparatus as in claim 26 further comprising an I2C master port coupled to the micro-controller.

36. An apparatus as in claim 26 further comprising an I2C slave port coupled to the micro-controller.

37. An apparatus as in claim 26 further comprising a read only memory (ROM) coupled to the micro-controller.

38. An apparatus as in claim 26 further comprising an SRAM coupled to the micro-controller.

39. An apparatus as in claim 26 further comprising an SD flash controller coupled to the micro-controller.

40. The apparatus of claim 26 wherein the micro-controller includes an 8051 micro-controller.

41. An apparatus as in claim 26 further comprising a SmartMedia interface coupled to the micro-controller.

42. An apparatus as in claim 41 wherein the SmartMedia interface is further coupled to the DSP.

43. An apparatus as in claim 26 further comprising an AC link interface coupled to the DSP.

44. An apparatus as in claim 26 further comprising an I2S port coupled to the DSP.

45. An apparatus as in claim 26 wherein the apparatus is a single device.

46. An apparatus as in claim 26 wherein the apparatus is part of a single device.

47. An apparatus as in claim 26 further comprising a device which is external to the primary device.

48. An apparatus as in claim 26 further comprising a device which is internal to the primary device.

49. The apparatus of claim 26 wherein an interface coupled to the micro-controller comprises a plurality of interfaces.

50. The apparatus of claim 26 wherein a storage location comprises a plurality of storage locations.

* * * * *